March 4, 1924.
S. K. SKRIHONIUK
VEHICLE WHEEL
Filed April 17, 1922   4 Sheets-Sheet 1
1,485,637
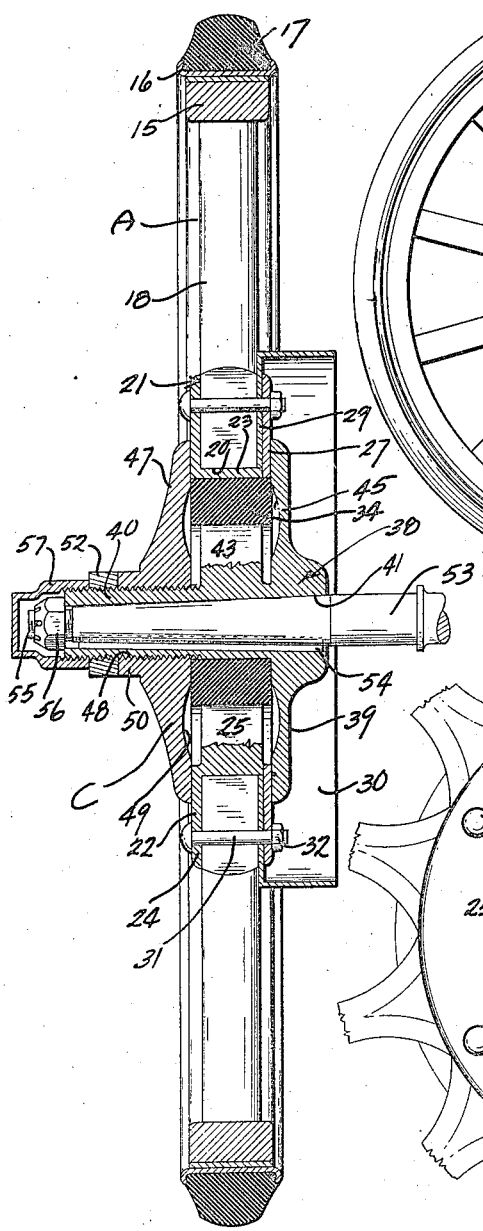
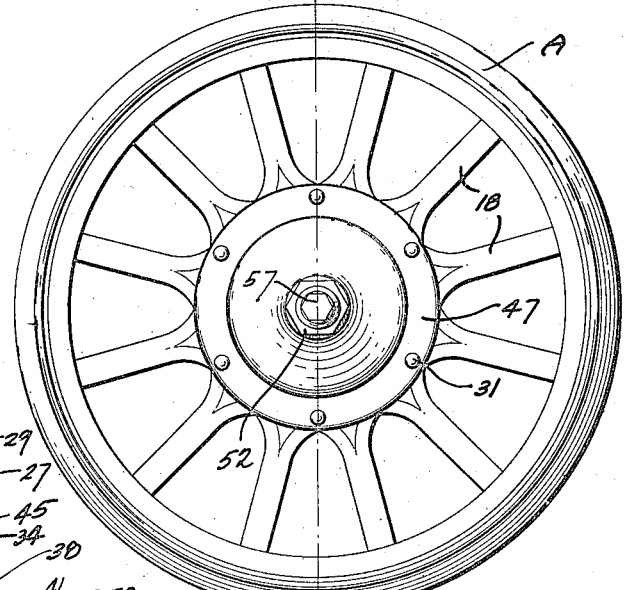
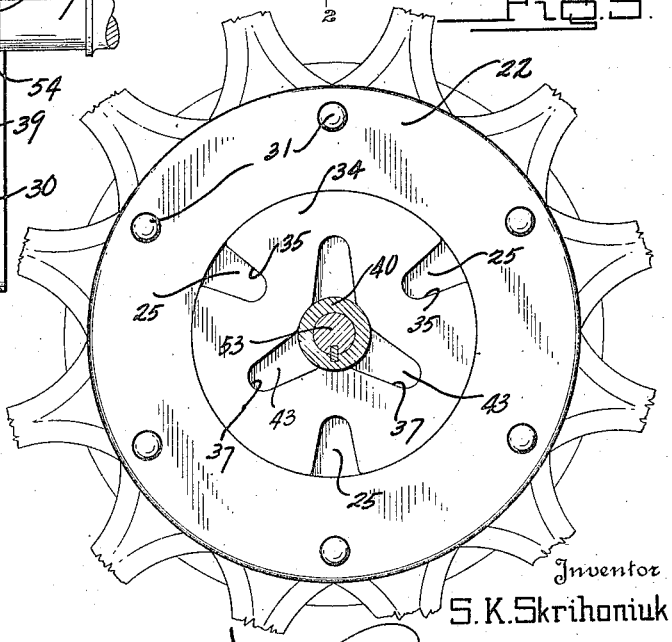
Inventor
S.K. Skrihoniuk
Attorneys March 4, 1924. 1,485,637
S. K. SKRIHONIUK
VEHICLE WHEEL
Filed April 17, 1922  4 Sheets-Sheet 2

Inventor
S. K. Skrihoniuk

March 4, 1924.
S. K. SKRIHONIUK
1,485,637
VEHICLE WHEEL
Filed April 17, 1922 4 Sheets-Sheet 3
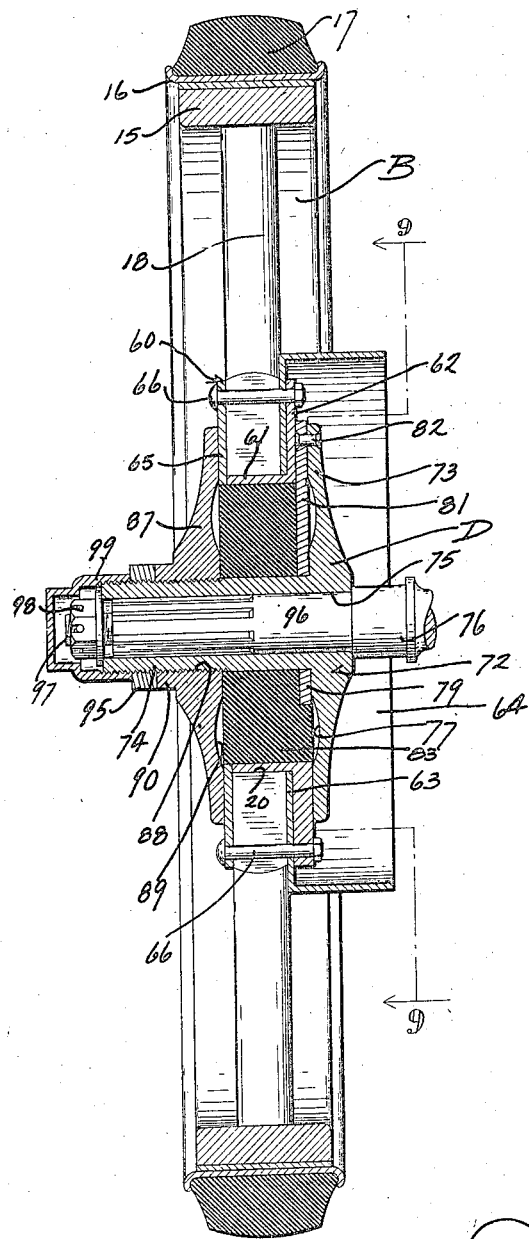
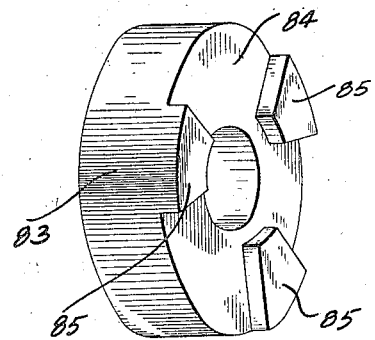
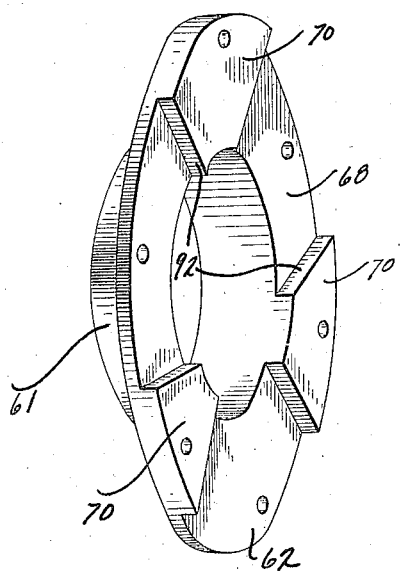
Inventor
S.K. Skrihoniuk

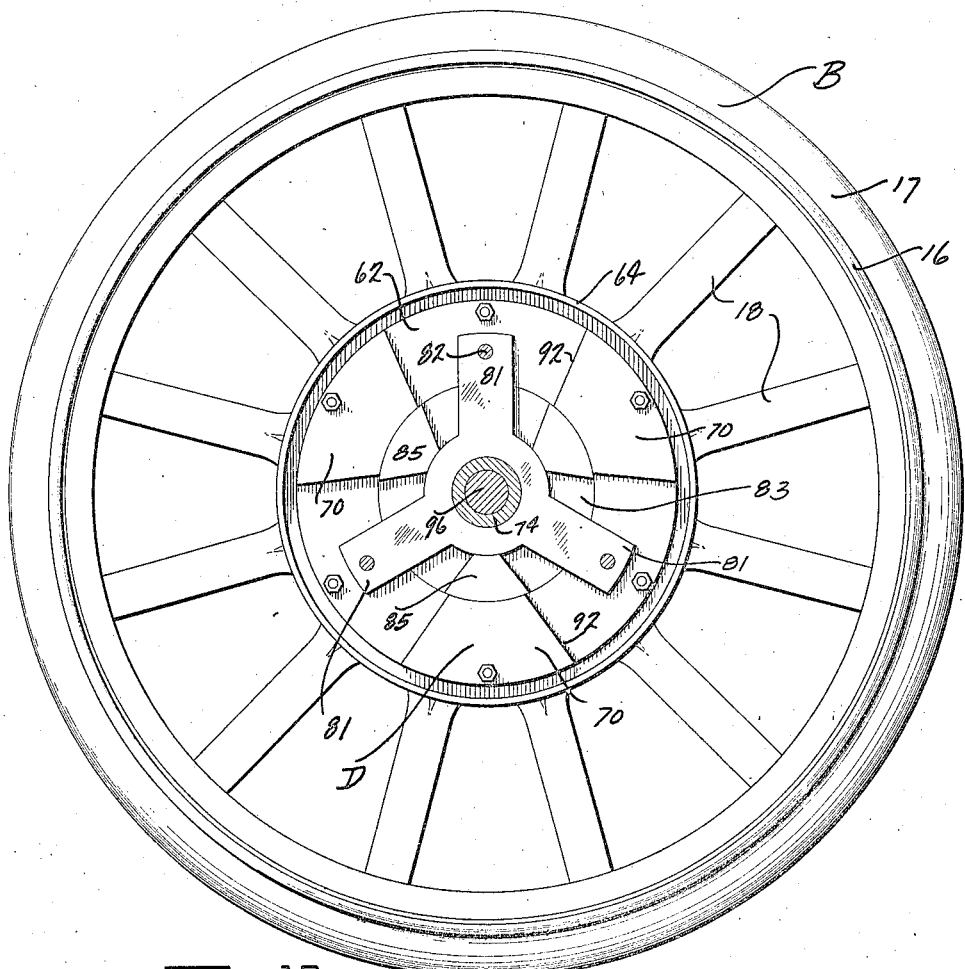
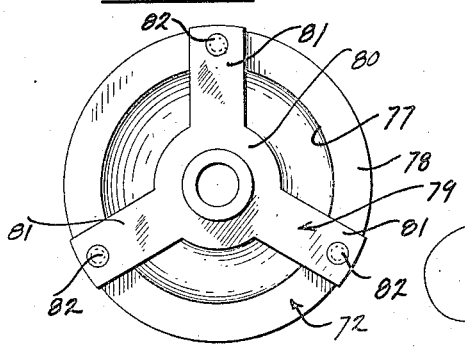

Patented Mar. 4, 1924.

1,485,637

UNITED STATES PATENT OFFICE.

STEVE K. SKRIHONIUK, OF DETROIT, MICHIGAN.

VEHICLE WHEEL.

Application filed April 17, 1922. Serial No. 553,537.

*To all whom it may concern:*

Be it known that I, STEVE K. SKRIHONIUK, a citizen of Russia, with first United States naturalization papers, residing at Detroit, in the county of Wayne and State of Michigan, have invented certain new and useful Improvements in Vehicle Wheels, of which the following is a specification.

This invention relates to an improved vehicle wheel.

The primary object of the invention is the provision of a vehicle wheel, including a novel hub structure, whereby the vehicle wheel may be supported in resilient manner from an axle spindle, so that the necessity of using a pneumatic tire therefor is done away with.

A further, and important object of this invention is the provision of a resiliently mounted vehicle wheel, particularly well adapted for use in connection with automotive vehicles, including an improved hub structure, which embodies a resilient supporting member, having the same so associated therewith that the vehicle wheel may utilize an ordinary solid tire, thereby securing all of the advantages of a vehicle wheel embodying a pneumatic tire, while doing away with the disadvantages incident to the use of pneumatic tires.

A further object of the invention is the provision of a novel type of hub construction for vehicle wheels, primarily designed with the end in view of resiliently supporting the vehicle wheel therefrom, and embodying a simple, practical, and durable assemblage of parts.

Other objects and advantages will be apparent during the course of the following detailed description.

In the accompanying drawings and specification, wherein similar reference characters designate corresponding parts throughout the several views.

Figure 1 is a side elevation of the preferred embodiment of this invention.

Fig. 2 is a transverse cross sectional view taken on the line 2—2 of Figure 1, and showing the cooperative arrangement of details thereof.

Fig. 3 is a fragmentary side elevation of the vehicle wheel, having parts thereof removed, to expose the internal working arrangement of said wheel.

Fig. 8 is a transverse cross sectional view taken through a vehicle wheel, and illustrating a modified form of this invention.

Fig. 9 is a side elevation of the modified form of the vehicle wheel, illustrated in Figure 8, showing details thereof removed and in section, in order to show the cooperating parts thereof, the view being taken on the line 9—9 in Figure 8 of the drawings.

Fig. 10 is an inside view of a detail of the modified form of vehicle wheel.

Figs. 11 and 12 are perspective views of details of the modified form of vehicle wheel.

Figure 4:
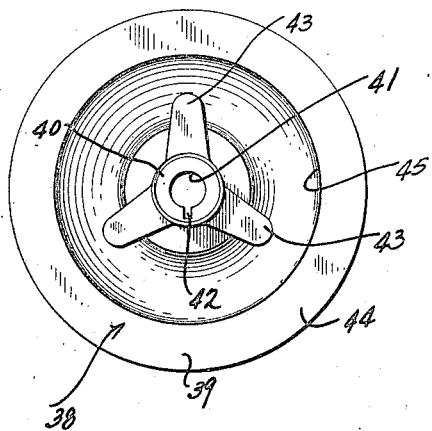
Figs. 4, 5 and 6 are side elevations of details embodied in the preferred form of this invention.
Figure 5:
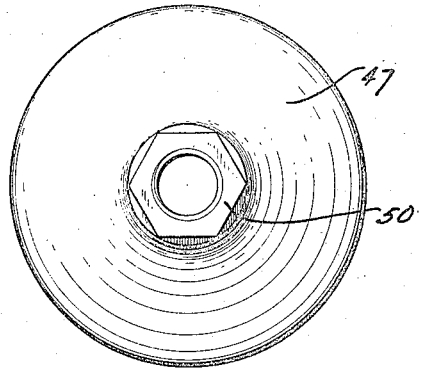
Figure 6:
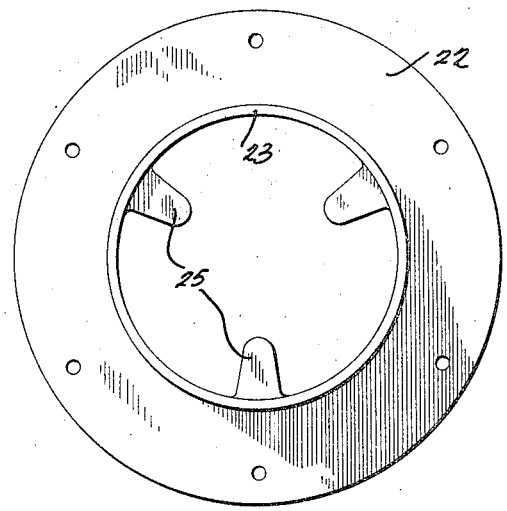
Figure 7:
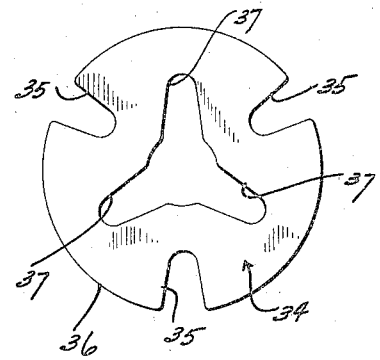
Fig. 7 is a side elevation of a resilient member embodied in the improved vehicle wheel.

In the drawings, wherein for the purpose of illustration are shown the preferred and modified forms of this invention, the letter A designates the preferred embodiment, and B the modified form of vehicle wheel, which respectively include the improved hub constructions C and D.

Referring to both the preferred and modified forms, the numeral 15 designates a felly of any approved construction, having the ordinary metallic rim 16 mounted thereon, which is adapted for receiving the solid rubber tire 17. Spokes 18, or a similar supporting arrangement such as a disc, are preferably provided for connection to the interior of the felly 15, in such manner as to provide the axial wheel opening 20 for the reception of the improved hub structures C and D.

Referring to the preferred form of hub structure C, the same includes a casing 21 which is adapted for cooperation with the spokes 18 of the vehicle wheel, in order to support the same adjacent the axial opening 20. The casing 21 includes a member 22 having a sleeve 23 formed integral therewith, which sleeve is adapted for disposal in the opening 20. A flange 24 is formed rigid with the sleeve 23. It is preferred, that projections 25 extend inwardly of the opening in the sleeve 23, and radially thereof, it being preferred that but three of these projections 25 be provided, at angles of 120° apart. A ring member 27, of metal, is preferably provided as a part of the casing 21, and adapted for association with the circumferential flange 24 of the member 22 in the clamping of the inner ends of the spokes 18 therebetween. In this manner, the flange 29 of a brake drum 30 may be clamped against the spokes 18, with the flat ring member 27 interiorly of the drum 30. Bolts 31 are then disposed transversely through the vehicle wheel, having the heads thereof disposed upon the outer surface of the flange 24, and provided with adjusting nuts 32 upon their inner ends, whereby said nuts may be clamped against the outer surface of the ring 27, and in order that the casing 21 may be securely clamped to the spokes 18 of the vehicle wheel A, in order to provide a reinforcement for said spokes 18, as well as to clamp the brake drum 30 in position. The brake drum 30 may of course be done away with, as in case the vehicle wheel is used as a front wheel.

A ring shaped member 34 is provided as a part of the improved hub construction C, preferably being formed of durable rubber. The resilient ring member 34 is provided with the recesses or indentations 35 radially inwardly from the outer periphery 36 thereof, which are provided for receiving the projections 25 of the casing 21 above described. The member 34 is recessed centrally thereof, to provide the radial recesses 37 extending from the center of said ring member outwardly toward the periphery 36, although terminating short of said periphery 36; these recesses 37 being provided in staggered relation with respect to the recesses 35 above described. It is preferred that there be three each of the recesses 35 and 37; the inner recesses 37 being provided for cooperation with a portion of the hub construction C which will be more fully described hereinafter.

A member 38 is provided, as a part of the improved construction, which includes a disc 39, and a hollow hub extension 40 extending axially outwardly from one side of said disc 39. An axial opening 41 is provided centrally through the member 38, having a key recess 42 longitudinally thereof. The hub extension 40 is provided with a plurality of projections 43 extending radially outwardly thereof, adjacent the inner surface 44 of the disc 39, although in spaced relation therefrom. These extensions 43 are provided for cooperation in the resilient ring recesses 37 above described. A circumferential groove 45 is provided, extending inwardly of the inside surface 44 of disc 39. The hub extension 40 outwardly from the projections 43 is screw threaded to the extreme end thereof.

A disc member 47 having a screw threaded opening 48 centrally therethrough, is provided as a part of the improved hub construction C, adapted for adjustable engagement over the screw threaded hub extension 40. This disc 47 is altogether similar to the disc 39 above described, and has a circumferential groove 49 upon the inner surface thereof, struck from the same radius as is the groove 45. The outer end of the disc 47 is preferably provided with a polygonal extension 50, for receiving a wrench, whereby said disc 47 may be easily mounted upon the extension 40.

In the assemblage of the improved hub construction C, the resilient ring member 34 is disposed over the hub extension 40, so that the same is seated circumferentially about the projections 43. The member 38 is then inserted through the opening defined by the casing 21, so that the outer marginal portion of the disc 39 engages the exposed surface of the clamping ring 27, substantially as illustrated in Figure 2 of the drawings. In this relation, the screw threaded hub extension 40 projects outwardly of the casing 21, opposite to the brake drum 30. Upon application of the disc 47, and adjustment of the same upon the screw threaded extension 40, the resilient ring 34 may be entirely clamped within the hub structure C, which forms a pocket between the discs 39 and 47. It is to be noted, that the disc 47 is not adjusted so that the same is in tight clamping engagement against the outer surface of the casing flange 24. A lock nut 52 may be provided, upon the screw threaded hub extension 40, for binding against the polygonal extension 50 of the disc member 47, whereby the latter may be clamped in a determined relation upon the hub extension 40. The spindle end of an axle 53 may then be slipped in the hub passage way 41, and keyed therein as at 54, so that the reduced screw threaded end 55 of said spindle 53 extends outwardly of the free end of the hub extension 40. The ordinary castle nut 56 may then be clamped upon the reduced axle end 55, so that said nut 56, contacts the outer marginal edge of the hub extension 40, substantially as illustrated in Figure 2 of the drawings. The hub cap 57 may then be detachably adjusted upon the extreme outer screw threaded end of the hub extension 40, substantially as is illustrated in Figure 2 of the drawings, and until the same contacts the lock nut 52. From this arrangement, it can be seen that the screw threaded hub extension 40 supports the disc 47, lock nut 52, and hub cap 57, in a simple and compact arrangement.

During travel of the vehicle wheel over a ground surface, it is obvious that shocks and vibration will be buffed by means of the resilient supporting ring 34, since the same, in fact, entirely supports the hub structure C with respect to the casing 21 and spoke structure 18. It is an important feature of this invention that room be given in the hub structure C for expansion of the ring member 34. This space is provided by the circumferential grooves 45 and 49 of the disc members 39 and 47 respectively. The discs 39 and 47 are free to slide with respect to the surfaces of the casing 21 which they abut. Upon starting of the vehicle to which the wheel A is attached, through the drive shaft 53, the driving action will be directly transmitted through the resilient ring 34 by means of the radial extensions 43. It is noted, that by this means a resilient driving contact is had between the driving axle 53 and the vehicle wheel A. This wheel A may be used as a front vehicle wheel, and in such case the drum 30 and axle keying means 54 may be dispensed with, so that the vehicle wheel A may be journaled upon the front axle end as in ordinary manner.

Referring to the modified form of hub construction D, the same presents features which are somewhat similar to those embodied in the hub construction C, although in this case, instead of a resilient driving contact between the drive axle and the vehicle wheel, a metallic driving contact is provided. To this end, the casing 60 is provided, which includes a portion 61 of sleeve like formation, and adapted for fitting within the opening 20 provided in the vehicle wheel B. A flange 62 is provided upon this sleeve 61, and preferably integral therewith, adapted for cooperation with the flange portion 63 of a brake drum 64 in the clamping of said drum 64 to the spoke construction 18. A ring shaped plate 65 is provided, as a part of the casing 60, and adapted for use in connection with the flange portion 62 for receiving a plurality of bolts 66 transversely of the spoke construction 18, whereby the casing 60 may be securely clamped about the inner portion of said spoke construction 18. In case the brake drum 64 is not used, the flange 62 may be clamped directly against the inside surface of the spoke construction 18. In all events, the casing 60 is provided for encasement of the spoke construction 18 which is disposed about the central opening 20. The outer surface 68 of the casing flange 62, is provided with a plurality of projections 70 which are substantially triangular in outline, and are preferably integral with the flange 62; said projections 70 being three in number, and extending outwardly upon that side of the flange 62 opposite the sleeve 61. Thus, when the casing 60 is assembled upon the vehicle wheel B, to mount the drum 64 thereon, the projections 70 will extend inwardly of the drum 64, substantially as is illustrated in Figure 8 of the drawings.

A member 72 is provided as a part of the improved hub construction D, which includes a disc 73, having a hub extension 74 of cylindrical appearance extending outwardly and axially from one side thereof. This member 72 is provided with an axial passage way 75 therethrough adapted for receiving the spindle end 96 of an axle 76 in a manner which will be subsequently described. The disc 73 is altogether similar to the disc 39 described for the preferred embodiment of this invention, and is provided with a circumferential groove 77 upon the inner surface 78 thereof. A spider member 79 is preferably provided, which has a hub portion 80 thereof disposed over the hub extension 74, so that the portion 80 contacts against the inside surface 78 of the disc 73. Arms 81 extend radially outwardly of the spider hub 80 and are riveted as at 82 upon their outer ends to the marginal portion of the disc 73.

A resilient ring shaped member 83, preferably of a good grade of rubber is provided, adapted for slipping over the hub extension 74, so that the same may abut against the spider member 79. The surface 84 of said resilient member 83 which faces toward the disc 73 is preferably provided with the triangularly formed projections 85 thereon, which are spaced to conform to the arrangement of the projections 70 upon the flange 62.

The hub extension 74, outwardly from the ring member 83 disposed thereon is exteriorly screw threaded, and adapted for adjustably receiving a disc 87 which is provided with the central screw threaded opening 88 for engagement with the screw threaded end of the extension 74. This disc 87 is provided with a circumferential groove 89 upon the inside surface thereof, bearing the same relation to said disc as the groove 77 bears to disc 73. A polygonal extension 90 is provided upon the outer side of the disc 87, for receiving a wrench, whereby said disc 87 may be adjusted upon the hub extension 74.

In the assembling of the ring 83 the spider arms 81 are disposed within the spaces on the ring member 83 intermediate the projections 85. In assembling this arrangement in the casing 60 of the improved vehicle wheel B, the extensions 85 of the ring 83 are disposed adjacent the extension 70 of the casing 60, similar to the arrangement illustrated in Figure 9 of the drawings. In this manner, the spider arms 81 are also disposed in the spaces upon the flange 62 intermediate the projection 70 thereon. It can readily be seen that the spider arms 81 are then adapted for coacting in the spaces 92 between adjacent extensions 70. The outer circumference of the ring 83, is of course, in snug engagement with the interior of the sleeve 61.

The disc 87 having been clamped upon the screw threaded portion of the hub extension 74, so that the ring 83 is intermediate the discs 73 and 87, it can readily be understood that the hub construction D is resiliently supported by said member 83 with respect to the spoke construction 18 of said vehicle wheel B. A lock nut 95 is preferably provided for cooperation upon the screw threaded hub extension 74, and against the polygonal extension 90 of the disc 87, whereby said disc 87 may be locked in predetermined relation to the disc 73, so that said discs may have a sliding relation to the casing 60.

The spindle end 96 of the axle 76 may be inserted in the passageway 75 of the hub construction D, so that the reduced outer end 97 may extend forwardly of the free end of the hub extension 74, to receive a castle nut 98, so that same may bear against the outer end of the hub extension. A hub cap 99 may be provided for screw threaded engagement over the hub extension 74, so that the same may bear the same relation to the hub extension as the hub cap 57 above described.

In the operation of this modified form of vehicle wheel, using the same upon the rear drive axle 76, it can be seen that the driving force of the axle 76 will be transmitted to the member 72, so that the spider arms 81 which are in fixed relation thereto will contact against the projections 70, so that a metallic driving contact for the vehicle wheel B is provided. It is obvious, that the spider arms 81 may play between the projections 70 of the casing 60 for reversing or forward driving of the vehicle wheel B, so that sudden shocks incident to starting will not result in any destruction of the hub arrangement D. Notwithstanding the metallic drive contact of this vehicle wheel B, the wheel is resiliently supported by means of the ring 83, which may expand into the grooves 77 and 89 provided respectively in the discs 73 and 87.

From the foregoing it can be seen that an improved vehicle wheel has been provided which while susceptible of embodiment in preferred and modified forms, possesses the outstanding feature of simplicity of arrangement, whereby clamping disc lock nuts and hub caps may be mounted upon the hub extension for housing a resilient supporting member in a pocket in the vehicle wheel construction, against liability of foreign material entering said pocket, yet cooperating in novel manner to permit sufficient expansion of the resilient member, that the same may take up shocks incident to driving.

Various changes in the shape, size, and arrangement of parts may be made to the forms of invention herein shown and described, without departing from the spirit of the invention or the scope of the claims.

I claim:

1. A vehicle wheel, comprising a rim construction, a spoke construction, a casing centrally mounted upon said spoke construction to provide an axial opening therethrough, said casing having projections thereon laterally of the axial opening, a hub member including a disc and a hub extension extending axially from one side of said disc, a spider member fixedly secured upon the same side of said disc upon which said hub extension is connected, a resilient supporting ring mounted upon said hub extension and adapted for disposition in the opening of said casing, and a second disc adapted for adjustable mounting upon said hub extension so that said discs are on opposite sides of said casing, said spider having arms thereon adapted for operating intermediate the casing projections.

2. As an article of manufacture, a vehicle wheel disc having a screw threaded opening centrally therethrough, and provided upon one face with a circumferential groove, and a polygonal shaped extension upon the opposite face of said disc.

3. In a vehicle wheel construction the combination of a central wheel member having an axial opening therein, a hub for disposition through the axial opening of said member, discs upon said hub on opposite sides of said member for enclosing said opening, and a resilient ring about said hub within the axial opening of said member and between said discs, said discs being in abutment with said resilient ring and also having circumferential grooves in a portion of the abutting surface into which the resilient ring may expand as the wheel is moved with respect to the hub to compress the said ring.

4. In a vehicle wheel the combination with a spoke structure defining an axial opening therethrough, of a hub structure including a hub extension exteriorly screw threaded inwardly from one end thereof and a flanged disc at the other end thereof, said hub structure adapted to have the extension thereof extending axially through the opening of said spoke structure with the disc at one side of the spoke structure to close that side of the axial opening thereof, a second disc in screw threaded engagement with the hub extension at the opposite side of said spoke structure to enclose said side of the axial opening, a ring shaped resilient member about the hub extension in the axial opening of said spoke structure, a locking ring in screw threaded engagement with the hub extension outwardly of and in engagement with the second mentioned disc to maintain said discs in a definite relation, an axle extending through said hub structure having a screw threaded end which extends outwardly of said hub extension, a lock nut structure for the screw threaded end of said axle adapted to be clamped against the hub and said hub extension adjacent the locking ring, and a hub cap for threaded engagement with the hub extension to enclose the axle locking nut therein.

5. A vehicle wheel structure comprising a spoke arrangement, a substantially ring shaped member affixed within said spoke arrangement to provide an axial opening therethrough, said ring shaped member at one side thereof having spaced projections which are disposed outside of the area of said axial opening, a hub extension, discs carried by said hub extension at opposite sides of the ring shaped member to enclose the axial opening, a resilient member in the axial opening about said hub extension having the ring shaped member first mentioned resting thereon to resiliently mount the wheel upon said hub extension, and a spider member secured at the inside of one of said discs having a plurality of spaced fingers which extend into the spaces between the projections of said ring shaped member in such relation as to permit engagement of the fingers of said spider with said projections.

STEVE K. SKRIHONIUK.